June 21, 1955 L. T. URBANETTI 2,711,054
APPARATUS FOR FORMING GLASS STRANDS
Filed Aug. 14, 1951

Inventor
LEBRO T. URBANETTI
By
Lindsey and Prutzman
Attorneys

United States Patent Office 2,711,054
Patented June 21, 1955

2,711,054

APPARATUS FOR FORMING GLASS STRANDS

Lebro T. Urbanetti, Manchester, Conn.

Application August 14, 1951, Serial No. 241,735

1 Claim. (Cl. 49—17)

This invention relates to the manufacture of fibrous glass strands and, more particularly, to improved apparatus and methods for use in drawing or attenuating glass filaments from a furnace or crucible containing a molten body of glass.

It has been the conventional practice in the manufacture of glass strands to provide a furnace or crucible containing a body of molten glass with a metallic plate or bushing having a plurality of orifices through which the molten glass is drawn or attenuated in the form of fibers or filaments. The furnace or crucible is arranged in an overhead position with the plate or bushing facing downwardly so that the fibers of glass may be drawn vertically downwardly a considerable distance to a gathering point where a plurality of such fibers or filaments are grouped as a strand. The strand is thereafter wound upon a drum or spool rotatably mounted with its axis generally parallel to the plate or bushing and in general vertical alignment therewith.

In accordance with standard practice, the orifices are directed vertically downwardly and the filaments drawn from the orifices must be drawn in a general vertical direction a substantial distance from the bushing before the filaments are gathered into strands so that the filaments will not be directed from the orifices at a relatively sharp angle. If the filaments are angularly directed from the orifices, they will engage the side walls which define the orifices and rupturing of the filaments at the orifices is likely to occur. Accordingly, the furnace or crucible with its bushing is disposed a relatively great distance from the gathering point to minimize the angular relation between the filaments and their respective orifices so as to reduce filament breakage at the orifice. For example, the furnace may be located on the floor or story above the location of the winding drum, thereby requiring the services of an attendant at two elevations.

In addition to the inconvenience resulting from the relative arrangement of the furnace and spool, the aforedescribed vertical arrangement has other disadvantages; for example, if a filament breaks at the orifice during operation, a bead of glass will generally form at the orifice. This bead of glass may thereafter fall from the plate or bushing into the filaments being collected in the formation of a strand, causing breakage of said filaments and/or causing inconformity in the formation of the strand.

It is a feature of the present invention to provide apparatus for the fabrication of glass strands which may be conveniently attended by a single operator and which may be utilized in installations wherein there is far less headroom available than is necessary for conventional apparatus.

A further feature of the invention is incorporated in an improved method of fabricating glass strands which includes drawing or attenuating glass filaments from the furnace laterally as well as downwardly so as to avoid falling beads or droplets of glass.

Accordingly, it is a general aim of the present invention to provide an improved method of fabricating substantially continuous glass fibers or filaments which are gathered to form strands of substantially uniform cross section.

Another object of the invention is to provide apparatus to facilitate the production of the glass strands in accordance with my improved method, said apparatus being characterized by its simplicity, compact arrangement and improved operating characteristics.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
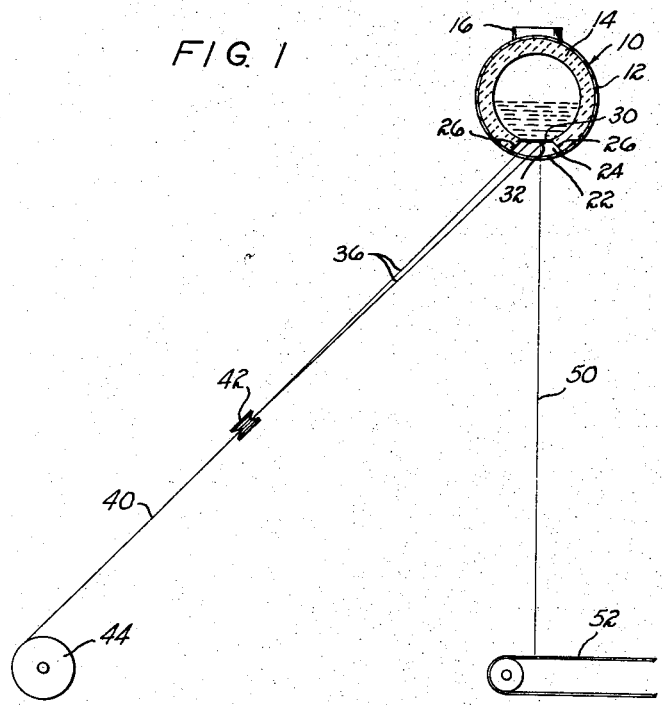
Fig. 1 is a diagrammatic transverse sectional view taken through a furnace containing a body of molten glass and showing the apparatus used in practicing my method of forming strands from glass filaments drawn from the furnace.
Figure 3:
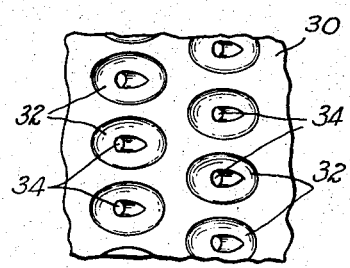
Fig. 3 is a fragmentary top plan view of the metallic plate or bushing utilized in the furnace.
Figure 2:
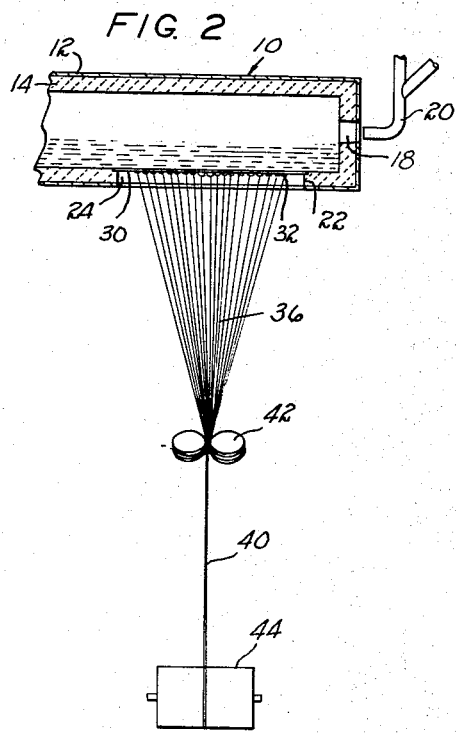
Fig. 2 is a fragmentary cross-sectional view taken along the longitudinal axis of the furnace and illustrating the other elements utilized in forming the strands.
Figure 4:
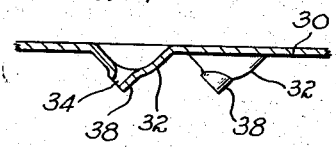
Fig. 4 is a transverse sectional view of the plate or bushing fragment illustrated in Fig. 3.

The furnace 10 shown in Figs. 1 and 2 is a type commonly used to reduce glass to the molten state and comprises a generally cylindrical metal jacket 12 which is lined with a refractory 14. The furnace is provided with a radial opening 16 for introducing the glass adjacent one end and is provided with an axial opening 18 adjacent the other end to accommodate a gas flame from a burner 20 disposed adjacent thereto. It should be understood that the glass may be introduced to the furnace 10 in the molten state as well as in solid form and the solid form may comprise reclaimed glass waste materials, fabricated pellets, etc. The form of the furnace or receptacle 10 and constitution of the glass batch forms no part of the present invention and it should be understood that any batch conventionally used in the manufacture of glass fibers can be utilized in the present fabrication process.

The furnace jacket 12 defines a generally rectangular opening 22 adjacent and below the flame and the refractory 14 has a registering opening 24 defined by outwardly diverging shoulders 26. The refractory is internally mortised or countersunk adjacent the opening 24 to receive a perforate drawing plate or bushing 30 which covers the internal end of the opening 24.

The drawing or attenuating plate 30 is formed of heat-resisting material, preferably metallic, and it has been found that nickel-chrome alloys are well suited for the purpose. In accordance with the present invention, the drawing or attenuating plate 30 is provided with a plurality of downwardly directed nipples 32 which are preferably arranged in parallel rows, the nipples 32 in each row being staggered in relation to the nipples 32 in the adjacent row. For purposes of illustration, in Fig. 1 two such rows are indicated to provide two parallel rows of attenuating orifices 34 through which the glass filaments 36 are drawn. The orifices 34 are defined at the terminus of a generally cylindrical appendage 38 on the nipple 32, the appendage 38 in each instance having a longitudinal axis which is directed downwardly and laterally so as to be angularly related to a line drawn normal to the plate 30. It has been found that in most installations an included angle of 45 degrees between the axis of the orifices and the vertical results in the best arrangement for practicing my method of attenuating glass filaments.

A portion of the molten glass within the furnace 10 will flow into the nipples 32 in the bushing 30 to be exposed to the atmosphere through the orifices 34. Filaments 36 may be drawn or pulled from the exposed portion through the orifices 34 and in substantial alignment with the axes thereof. The filaments 36 are then collected or gathered into a strand 40 by directing the plurality of filaments 36 through a conventional gathering device 42 in the nature of a pair of opposed pulleys. The strand 40 is then secured to and wound upon a drum or spool 44 which is rotatably mounted below and laterally of the furnace 10. The drum or spool 44 may be power driven and will provide the tensioning force in the strand 40 to draw or attenuate the fibers 36 from the furnace. The size of the filaments and strands can be varied according to conventional practice i. e. by varying the rate of attenuation, the size of the orifice openings and the heat of the batch.

It will be noted in Fig. 2 that the filaments 36 are formed as a strand by gathering the filaments drawn from the orifices 34 of the plate towards the central transverse axis of the plate. In accordance with the present invention, the orifices 34, in addition to being angularly directed towards the spool 44, may be also directed towards the central transverse axis of the plate to avoid drawing the filaments at an angle from the axis of the cylindrical tip 38 of the nipple 32.

Thus, the arrangement of the nipples and orifices relative to the plate 30 provides for drawing the filaments from the furnace 10 downwardly and laterally to permit the installation of the furnace and the spool within quarters wherein there is little head space available. An attendant or operator can oversee the operation of the spool and at the same time conveniently check the operation at the furnace. In the event of filament breakage at an orifice, a molten globule will form. In either instance, the globule or bead may partially solidify and may drop from the plate 30, in which case a vertically depending filament 50 will result. In the present arrangement the filament 50 will not interfere with the filaments 36 and will not disrupt the operation of collecting said filaments 36 into a strand 40. Thus, an operator can complete a spool despite breakages in certain of the filaments. The present arrangement provides that the filament 50 will fall vertically to a collecting and take-off arrangement such as the conveyor 52.

It has been found that in utilizing the aforedescribed apparatus and method for drawing or attenuating filaments and for forming said filaments into strands, filament breakage infrequently occurs. Consequently, the strand formed by the collected filaments is of uniform weight and thickness and it has also been found that the spool or winding drum 44 can be operated over extended periods in the strand winding operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

Apparatus for forming a substantially uniform strand or glass fibers from a molten body of glass comprising a receptacle arranged to contain a body of molten glass and provided with an outlet in the lower wall thereof, a metallic plate generally horizontally disposed in said outlet and having a row of horizontally spaced orifices therein, said orifices having flow axes focused at a common point located below said row of orifices and laterally displaced from a vertical plane through said row of orifices, means for pulling fibers from the molten body through said orifices in substantial alignment with the axes thereof, and means for grouping said fibers as a strand at said common point.

References Cited in the file of this patent

UNITED STATES PATENTS

| 2,255,426 | Lamesch | Sept. 9, 1941 |
| 2,448,499 | Swann | Aug. 31, 1948 |

FOREIGN PATENTS

| 449,233 | Germany | Sept. 7, 1927 |
| 740,049 | France | Jan. 20, 1933 |
| 823,535 | France | Jan. 21, 1938 |
| 692,753 | Germany | June 26, 1940 |